Patented Sept. 6, 1932

1,875,352

UNITED STATES PATENT OFFICE

PHILIP R. PARK, OF BUFFALO, NEW YORK, ASSIGNOR TO PHILIP R. PARK, INC., OF SAN PEDRO, CALIFORNIA, A CORPORATION OF CALIFORNIA

MARINE PLANT PRODUCT AND METHOD OF MAKING THE SAME

No Drawing.   Application filed September 5, 1928. Serial No. 304,178.

My present invention relates to the rendering available of certain factors in foods which are necessary or desirable in the conservation of health or in the prevention or treatment of disease. The importance of the inter-relation of certain elements in food has become a matter of rapidly increasing concern among those involved in the preservation of health or prevention or treatment of disease. It has become generally recognized that a deficiency in any of these factors destroys or impairs the balance of assimilation so that even where other necessary items are present, the absence of another necessary and supplementing factor may prevent the proper assimilation of the rest.

Among these factors commonly recognized as of high importance are certain of the elements generally classified as mineral which have so large an influence on certain organs as to be absolutely controlling. The instance of iodine in its relation to the thyroid gland is one of common knowledge and much valuable work has already been done along this line. Somewhat less recognized are the effects of nickel, manganese, cobalt copper and many other metals on the functioning of the glands and other organs. The study of relation and the inter-relation of these metallic factors in foods and their digestion or their stimulative or reactionary functions obviously involves great difficulty on account of the minuteness of the factors involved and the extreme subtlety of their chemistry.

While the effects of the lack of these factors have been appreciated, there has been much difficulty in providing a source of such factors even on an administrative basis and the problem of making such factors available on what might be called a dietetic basis has been infinitely more difficult. The very matter of the cost is of very great importance because subjects most likely to need treatment are most often deprived of treatment for the very reason that has caused the original insufficiency or inadequacy of their diet.

This proposition holds true not only for the human family but among domestic animals. The characteristics in diseases or maladies of animals due to such deficiencies are the same or very similar to those of diseases and disorders in the human family. The provision, therefore, of a source of these factors generally lacking or insufficient in foods is a matter of the greatest importance and the cheapness and reliability of such a source is one absolutely vital to society and increasingly so as population extends to geographical areas which are deficient in these mineral factors now known to be necessary to man as well as beast.

In this connection it is to be borne constantly in mind that in so far as man is quite generally dependent on animal source for food and very generally and extensively during infancy and youth dependent on milk and eggs, the importance of the full complement of mineral supply or chemical reactive balance to the animal life on which he depends is very great.

Medicine and science have made considerable progress in dealing with this problem, but so far results have only been attainable at costs prohibitive to the poorer classes. One of the most important causes of this is the now generally recognized propositions that these element factors of food are only very ineffectively made available through inorganic compounds and are most efficiently administrable in organic compounds. This is well illustrated by the modern method of treatment for anaemia in which the iron factor is administered in an organic form as by a diet of liver or the extract of liver or its vegetable approximate, or in the case of goitre by the administration of a natural or an artificially iodized fat or oil. It will be recognized that these two cases which instance both the natural food as a curative source and an artificial product, each involve difficulties and expense. Also, because patients in disease are frequently unable to take such treatment over long periods or only reluctantly so. Furthermore, the rate of assimilation of the desired factors is uncertain and there is difficulty in determining whether the patient is receiving proportions which are in accordance with his or her powers of assimilation at the time.

My invention contemplates a source of these food factors available in considerable variety and in an organic form assimilable according to the needs of the patient such factors to be available at such low cost that they may be used freely on a preventative as well as a curative basis. The importance will be immediately seen of such a source providing varied factors in sufficiently large amounts so that they can be used to supplement an otherwise normal diet and in an organic form in which they may be assimilated as the needs of the consumer may require.

I have found such a source in unlimited quantities, in marine plant life commonly available, and even not unknown, for human or cattle food. I understand that various peoples have eaten and do eat marine plant life, such as rock weeds or kelps, and cattle have been known to eat such plant life of their own volition, and in some places such plant life is harvested and fed to cattle for economic reasons. I am not aware, however, that any one has appreciated the possibilities of this source for a definite product intended and available for use in supplementing relation to normal diet and with reference to the natural regional deficiencies. In regions like that of the Great Lakes where there is a notable deficiency in iodine the resultant goitre has become a matter of increasing alarm both as to humans and the food animals.

One of the difficulties with the marine plant life as a source has been due to the fact that considered as food they have been structurally difficult for mastication and ordinary processes of digestion. As plants they have generally been of apparently tough, rubbery character. When fresh they are of excessively high water content, or when dry of a harsh and resistant nature.

Furthermore, it has not, I believe, been recognized that in this plant life the elements or factors desired are present in organic forms closely analogous to the artificially produced oily or fatty product with the iodized fat or oil, whereas in fact they are as a natural organic product in a much more perfect state of harmonization as regards the desiderata of metabolism.

My invention therefore may be said to have as one of its important concepts the utilization of these organic compounds on a basis of practical administrative availability. I mean by this that they can be administered in any acceptable medium either on a curative or preventative basis, or what is generally more important, may be supplied in ordinary diet to the food generally available in proportions which will supplement any deficiencies as may be incident to that food. Furthermore, I contemplate such administration on a basis of stimulation and coordinated reactions as in the enzymic transmutations such as take place in the rumen of the cow where the vitamin translation is characteristic.

I have therefore suggested the relation of the sources of the factors involved through animal food, but as the importance of the succession is not generally understood I call attention to the following as indicating the practical importance and almost infinite possibilities of my invention. I shall at this point refer primarily to cattle, although it will be understood that the same applies to poultry and other animal sources of food.

One of the great difficulties in animal culture as in stock raising or breeding has been the drain on the female owing to the demands made by nature in reproduction for example on the thyroid gland. Whether this be considered as the milk or otherwise as immediate food for the calf or whether it be considered as human food, the results are the same, the only difference being in variation and extent. It is well recognized that the reproductive or feeding (milk) demands on the cow may be such as to deprive her of factors absolutely essential to her own health unless those requirements are so liberally and generally available in her food that she need not draw on her own body resources, such as her own fat or bone structure, to supply them. To the extent that she is unable to supply, regardless of sacrifice, her milk with these factors, the milk will be deficient. To the extent that she is able to supply these factors liberally her milk will be of the highest possible standard and her own health preserved. Furthermore, I have found that if these factors are available in organic form and in proper relation, the milk will be beyond what has heretofore been considered standard, and actually in excess, for example, in iodine, more than 100 times normal heretofore found.

Such milk whether taken by the calf or whether produced in the herd as a milk supply for humans becomes therefore a new food factor and source of these very mineral elements that are so frequently lacking in human diet. Furthermore, in the milk they are likewise available in organic form and ready for assimilation as a part of a diet capable of being administered to children or even infants. These elements not only appear in augmented amount in milk, but concentrate in butter made therefrom and even appear in the animal fat so that oleo products from cattle so fed are desirably augmented.

Where poultry is so fed the eggs show a similar response to these factors. As another phase of the result of such a feeding, the general improvement in the health of the cattle, poultry or swine generally is so great as to show very marked results in the reduction of breeding difficulties well known to stock men. For example, there is a very considerable reduction in the percentage of tuberculosis and other diseases in cattle, and a considerable abatement in abortion of the birth of deformed or hairless offspring as well as a reduction in disorders such as paralysis in poultry. It will therefore be seen that developed consistently on the basis of diet for the human or the animal direct or indirectly through the animal to the human, we have a workable basis on which nature through its normal functions can maintain health.

Returning to the consideration of the marine plant life source for this purpose, I have previously pointed out the apparent oversight of the great potential advantage in these organic forms of such factors as the minerals and their apparent analogy to the artificially treated fats and oils. Especially that the superiority of the natural product over any artificial product heretofore known has apparently never been appreciated. I am aware that there has been some dispute among eminent authorities as to the organic character of the mineral elements in marine plants. For example, there has been some disagreement among investigators as to the form of iodine in marine algæ. Eschle, (Z. F. physiol. Chem. 23, 1897, 30) and Okude and Ete (J. Coll. Agr., Imp. Univ. Tokyo, 5, 1916, 342-53) found that practically all of the iodine contained in seaweed is in organic combination, whereas Tsukamoto and Furakawa (J. Agr. Soc., 128, 1912, 1) concluded that the iodine was in an inorganic form. Okude and Ete found that the organic iodine compounds were comparatively easily decomposed; moreover, the organic iodine compounds which they discovered were soluble in water, alcohol, dilute acid and dilute alkali solutions. Later authorities support me in my proposition that there is in the marine plant life a very substantial organic part of the metallic component which has not been analyzed but is definitely contained. I believe this most important and my concept provides for its utilization on ascertained lines. While I am in no position to dispute the inorganic theory I have been by my investigations led to accept the organic theory and to believe that there exists for example a close analogy between the iodine (sic) compound in the kelp and the iodized (sic) fat produced artificially. Some of our American authorities have established proof of the extensive localization of iodine in milk fat and the apparent direct assimilation of such fat through the walls of the digestive tracts. If this is correct then by an augmentation of the iodine in the milk (fat) or by the administration of organic iodine from marine plant life in accordance with my invention, I do administer the iodine (or sic mineral) in the most efficient way, i. e. directly to the blood in an assimilable organic compound.

When taken on the basis of my concept (i. e. that of a definite supplement or the supply of a food deficiency) the difficulty of rendering this organic compound available is eliminated by my invention.

While a great variety of marine plant life is more or less available I have found that certain types are best adapted to the practice of my invention. For example, I have found that some of the sea weeds and some of the kelp family have in their fresh state what might be called a secretion in what might be termed a cellulotic state. I call attention particularly to the commercial kelp of the Pacific coast scientifically known as the *Macrocystis pyrifera*. This is what is known as gaint kelp. This grows on rocky bottoms and is usually found on exposed coasts where there is a continuous swell. The larger groves occur at depths of water varying from 60 to 10 fathoms.

Where such types of kelp or rock weed are not available, other types may be used by reducing the natural growth to a form or condition in which it may be mixed conveniently with cereals or other foods acceptable to humans or to cattle. As these mixtures and proportions are potentially so many and so varied, I shall not attempt to describe them except to say that they may be mixed with corn meal, bran, middlings, cotton seed meal and linseed meal or any such food or food ingredient. Where desired, my product may be mixed in any ration, as with fishmeal, tankage, etc. these being adapted as desired for cattle, poultry or hogs.

While I may produce any one of these mixtures, I find it desirable in accordance with my invention to produce it for distribution as what might be termed a basic product in which form I may for example supply it somewhat extended in a mixture to be added on the basis of a definite percentage to the ration to be fed to the cattle. For such cattle food I would preferably supply certain additional factors usually desired in the ultimate but not present in the marine plant. For human consumption the product might be supplied in a cereal mixture of the so-called breakfast food type. I have found that for the average marine plant source, as for example the kelp, the pulverized product may be advantageously used in the ultimate bulk food to about 5% to 10%.

This may be varied in accordance with the type of kelp used and according to the locality in which it is to be fed. In preparing the kelp as distinguished from the separation of the kelp secretion heretofore described, I preferably dry it and grind it so that it is not only capable of being thoroughly mixed and extended in any mass, but so as to expose it to the digestive juices so that it can be more readily assimilated.

Taking for example kelp as a characteristic form of plant life, the problem is to render it available for consumption and more so to make it possible as a matter of diet in the course of ordinary provendering for humans or cattle.

Kelp and like marine growths are difficult to render dietetically available because they are largely of tough character and difficult to masticate and digest. They must obviously be rendered palatable and digestible and that without material loss of their constituent properties.

Much has been written as to the needed treatment of these marine plant sources but according to my concept there has been a failure to recognize certain possibilities which are available to secure the ends sought.

It has been an ancient custom in many countries to dry out these plants by natural means, such as sun drying and such products have been found to have substantial values. It has been suggested, however, that such processes resulted in certain decompositions and it has been sought to avoid these by artificial approximations of the sun drying processes by working at low temperatures.

There seems, however, to be in such drying a deterioration generally similar to that of sun drying. The reason asserted for the slow low temperature processes was that theoretically the plant juices would be lost if the temperature was carried above the boiling point of such juices.

My present concept is at considerable variance with such theories. I contemplate in the first place a cooked product rather than a mere dried product. The desirability of a cooked product is consistent with the preparation of other foods and the results attained by me both in the character of the product which is easily masticated and readily digested indicate that my process has a complete efficiency in the conservation of those desired factors in the plant itself.

While I have referred to my process as involving the cooking of kelp or the like, I believe that there is involved in my process something more than the word cooking ordinarily implies. I therefore offer the following as a theory without intending to be bound thereby.

The cellular structure of kelp although selectively permeable, has a considerable wall strength and is therefore resistant to ordinary digestive juices. Thus the cell wall in an undisrupted state, might, very naturally, exclude the digestive juices from those very portions of the cell which would be most likely to be high in the very properties desired to be extracted by digestion. In interpreting my invention, therefore, I have conceived of the cooking as being at least in part a disruptive function under which the internal moisture of the cell being rapidly raised above the boiling point exerts a steam pressure sufficient to open up the cells and so make them more readily digested.

In carrying out my process I take kelp and in my practice so far I have used principally the Pacific kelp of rather shoal water origin as it can be conveniently harvested and is of a plant formation well adapted to processing in large quantities and one of a high content of desirable factors. The harvested kelp is cut up and immediately subjected to a rapid cooking at high temperature. I find that at 800° to 900° F. the kelp undergoes a very rapid physical change in which the plant juices instead of being lost as might naturally be expected, are cooked in to the plant structure and retained thereby. I then continue this cooking with a diminution of temperature as the product dries down continuing the process until the product is in a practically dry state, that is to say, containing only a few percent of moisture.

In this dried form the product may be easily comminuted or powdered and is then in a condition in which it is both palatable and digestable. It may be eaten in any form or in any mixture it being particularly well adapted for blending with cereal bases either as breakfast foods so-called or in balanced rations for the feeding of live stock.

The tests conducted by me through comparative feedings of my product in a balanced ration as against a similar ration without my product shows a very marked degree of assimilation by the animal so fed. This is true in the case of rodents so fed for definite periods and then ashed and also is clearly demonstrated by the increase of certain desired factors such as iodine in the milk of cows similarly fed. I believe that this milk test is not only convincing as a gauge of efficiency of my food, but is also a most valuable factor in the treatment of humans as it thus becomes possible to transmit to individuals incapable of performing their original digestive processes of my food those factors which my product contains. In other words, my product is so digestible and so palatable that it is not only adapted to ordinary human diet, but for the same reason may be fed in quantities to cows with a resultant high increase of these factors in the milk. Tests have shown such an increase of 300% in the iodine content of cows' milk.

My process may be practiced with any convenient apparatus in which the natural kelp can be quickly and rapidly cooked at high temperature. Preferably the same apparatus should be capable of providing for the diminuendo in temperature. In practice I use a roaster of the rotary type through which my material is passed from the hot end at which the temperature is maintained at about 800° to 900° F. to the cooler end at which the temperature is around 200° to 300° F. This is a very convenient form of apparatus as it provides for continuity in the process and is capable of regulation both as to rate and quantity of feed so that the initial rapid cooking maintains the values of the juices while ultimately drying out the product by the elimination of the contained water. I have referred herein particularly to kelp as being a recognized convenient and rich source of the desired elements and one particularly adapted to my cooking process. The cellular structure of the kelp seems to undergo a modification by the cooking which renders it entirely acceptable as a food both for humans and for cattle, the property of the colloidal constituents to gelatinize when again brought in contact with water being practically completely destroyed.

What I therefore claim and desire to secure by Letters Patent is:

1. The process of treating marine plants such as kelp which consists in rapidly heating the same initially to a temperature sufficiently high to disrupt the plant cells and to seal the plant juices within the plants, and in then drying out the plants at lower temperatures.

2. The process of preparing marine plant life such as kelp for food purposes which consists in cooking the same initially at a temperature sufficiently high to quickly disrupt the plant cells, and then drying out at progressively diminishing temperatures.

3. The process of treating marine plants such as kelp and the like which consists in quickly heating same initially to a temperature sufficiently high above the boiling point of the plant juices to effect cooking of the plants and to sear the plant surfaces thus to close the plant pores to prevent loss of the plant juices.

4. The process of treating marine plants such as kelp and the like to obtain a desiccated product having preserved therein in readily assimilable form substantially all of its naturally occurring organically combined mineral constituents and soluble marine salts, which consists in subjecting the material to a temperature well above that of the boiling point of the plant juices and which temperature desiccates and sears the plant constituents by practically instantaneously evaporating the entrained moisture or water of the plant and simultaneously concentrating and sealing in the soluble marine salts so as to practically completely destroy the property of the organic colloidal constituents to gelatinize when again brought in contact with water.

5. A new desiccated product derived from kelp or kindred marine plant growths, said product containing substantially all of the naturally occurring organically combined mineral constituents as well as the soluble marine salts of the original plant and in which product the gelatinizing properties of the original material have been practically destroyed.

In testimony whereof I affix my signature.

PHILIP R. PARK.